Dec. 13, 1949     W. F. LEE ET AL     2,491,323
SHAFT BEARING FOR ROVING FRAMES
Filed Oct. 24, 1946
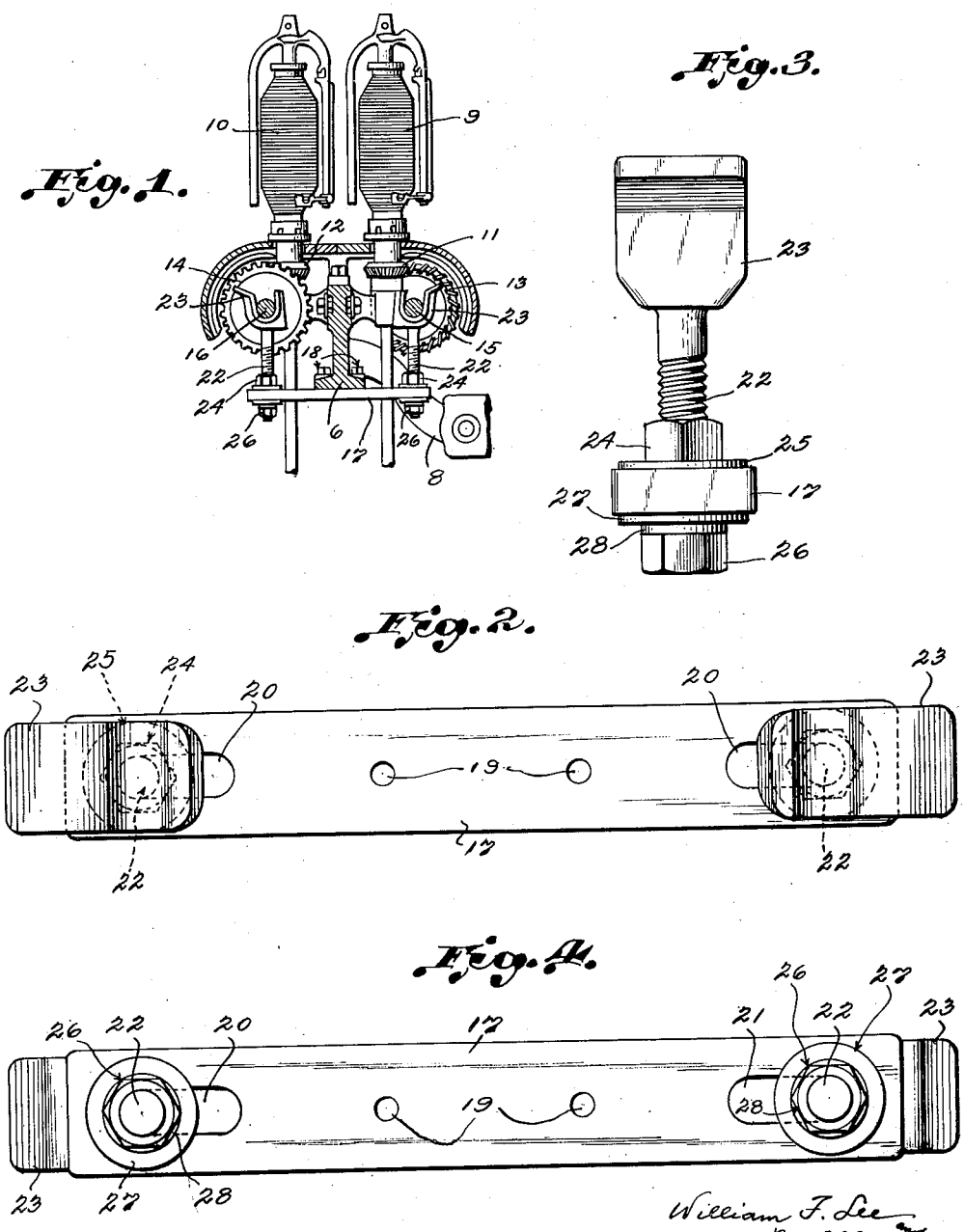

Patented Dec. 13, 1949

2,491,323

UNITED STATES PATENT OFFICE 2,491,323

SHAFT BEARING FOR ROVING FRAMES

William F. Lee and Joseph B. Allen, Glendale, S. C.

Application October 24, 1946, Serial No. 705,432

5 Claims. (Cl. 57—102)

This invention relates to adjustable hook bolsters or bearings for carriage shafts of the roving frame of a bobbin winding machine.

The main object of the invention is to provide a bearing for each shaft and means whereby the respective bearings can be adjusted both vertically and horizontally whereby when the shafts or bearings wear the same can be adjusted to take up such wear and thereby always provide a good contact between the usual large bevel gear mounted on the bearing shafts with the pinion gears mounted on the vertical or bobbin shafts.

It is also another feature of the invention in the event that the bearings become worn out, the same can be easily and readily removed and replaced by new bearings. In the prior art devices, the carriage shafts were normally supported by what are known in the art as "hook bolsters" and in the event that they became worn, it was necessary to dismantle the machine to make replacements.

The invention is illustrated in the accompanying drawings, in which:

Fig. 1 is a vertical sectional view of that much of a roving machine to which the invention is applied;

Fig. 2 is a top plan view of the bearing construction;

Fig. 3 is an elevational view of one of the bearing members; and

Fig. 4 is a bottom view of the bearing construction.

Referring specifically to the drawings, 6 indicates the usual bolster rail of a roving frame which is normally supported as by a part of the machine 8, only a part of which is shown.

The roving frame comprises the usual bobbins 9 and 10 mounted on spindles which are turned by bevel pinions 11 and 12 meshing with spur gears 13 and 14, said gears being mounted on the spindle driving shafts 15 and 16. Of course, it will be understood that the roving frame includes a plurality of pairs of bobbin spindles, pinion gears and spur gears.

So far, all of the mechanism described is well known in the art and our invention comprises a piece of strap metal 17, fastened as by bolts 18, to the lower flanged portion of the bolster rail 8, bolts 18 extending through the flanged rail and into screw openings 19 within the strap metal piece 17. The strap metal piece 17 is provided at each of its ends with slots 20 and 21, said slots receiving the screw threaded end 22 of a shaft, this shaft terminating at its upper end in a U-shaped bearing or bolster 23, said bearing adapted to receive the shafts 15 and 16 of the roving frame. The bearing members 22 are attached to the strap metal 17 as by nuts and washers mounted on opposite sides of the strap 17, the same comprising a nut 24 and washer 25 on the upper side of the strap and a nut 26, a washer 27 and a lock washer 28 on the lower side of the strap. Thus, it will readily be seen that the bearing members 23 can be readily adjusted vertically and longitudinally with respect to the strap supporting member 17 by simply loosening the nuts and moving the bearing to any desired position. Thus, when the carriage shafts 15 and 16 become worn, it is possible to adjust the bearings vertically and horizontally and in this manner restoring the large bevel gears and the small pinions into proper mesh engagement and thereby avoid looseness of the parts. This has been impossible with the prior art devices.

It will thus be seen that we have provided a relatively simple bearing mount for the carriage shafts of a roving machine frame, one in which the bearings can readily be removed and replaced in the event the same should become worn out and also can be adjusted horizontally and vertically to take up any wear which may be present from time to time and thus produce shaft supports which will always keep the gear and pinion mechanism which operates the spindles in a proper meshed condition and thereby avoid looseness and improper operation of the roving frame. Further, the bearings can be readily removed and replaced when desired without touching any other part of the roving frame.

The invention is not intended to be limited to the exact construction shown but is capable of modification and variation within the scope of the following claims, and it will be understood, of course, that various anti-friction or bearing means may be availed of for disposition between the shaft 15 and the bolsters 23.

What we claim is:

1. A bearing support for the carriage shafts of a roving frame comprising a strap metal piece mounted on the bolster frame of said roving frame, said strap metal piece extending transversely of said bolster frame and extending to opposite sides thereof, and adjustable bearings on each end of said strap metal piece and engaging the carriage shafts.

2. A bearing support for the carriage shafts of a roving frame comprising a strap metal piece, bearings mounted on each end of said strap metal piece, said bearings comprising a bearing portion terminating in a screw threaded stem, slots in the strap metal to receive said stems, and nuts engaging the threaded stems to support the bearings in fixed relation with respect to the strap metal piece.

3. A bearing support for the carriage shafts of a roving frame comprising a strap metal piece, bearings mounted on each end of said strap metal piece, said bearings comprising a bearing portion terminating in a screw threaded stem, slots in the strap metal piece to receive said stems, and nuts engaging the threaded stem, both above and below the strap metal piece, to support the bearings in fixed relation with respect to the strap metal piece.

4. A bearing support for the carriage shaft of a roving frame comprising a strap metal piece mounted on the bolster frame of said roving frame, adjustable bearings at the respective ends of said strap metal piece, said bearings engaging the carriage shafts of said frame, and the means for adjusting the bearings both vertically and longitudinally with respect to the strap metal piece.

5. A bearing support for the carriage shafts of a roving frame, said bearings comprising open ended U-shaped members, a supporting base for said bearings comprising a strap metal piece provided with longitudinal slots at its respective ends, said bearings terminating in screw threaded portions extensible through said slots, and nut and washer means engageable with the screw threaded stems of the bearings and also engageable with the strap metal piece, whereby the bearings can be adjusted as desired.

WILLIAM F. LEE.
JOSEPH B. ALLEN.

REFERENCES CITED

The following references are of record in the file of this patent:

UNITED STATES PATENTS

| Number | Name | Date |
|---|---|---|
| 149,498 | Mayor | Apr. 7, 1874 |